March 18, 1930.  L. MAMBOURG  1,751,045
GLASS TANK
Filed March 3, 1927
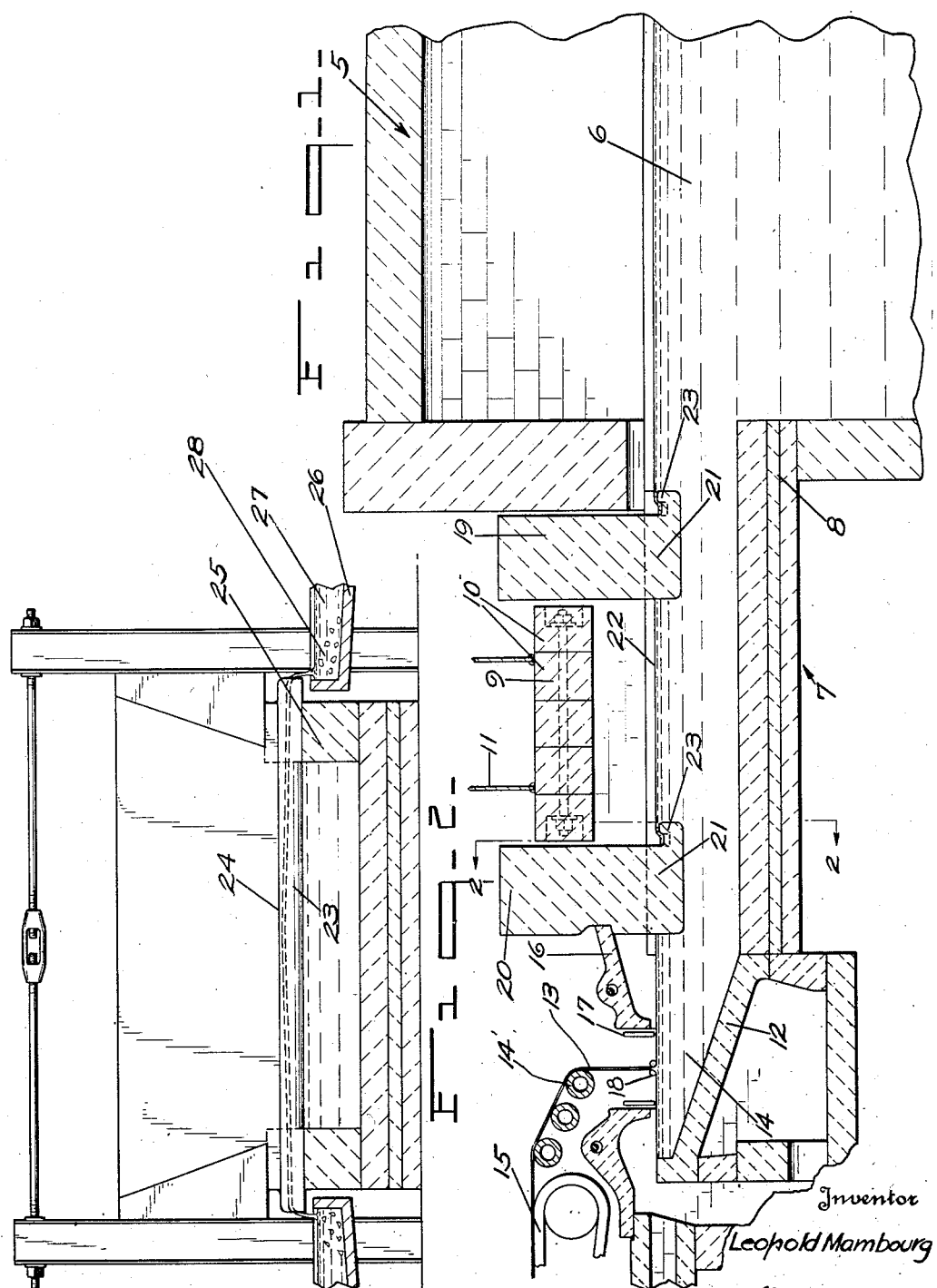
Inventor
Leopold Mambourg
By Frank Fraser
Attorney Patented Mar. 18, 1930

1,751,045

UNITED STATES PATENT OFFICE

LEOPOLD MAMBOURG, OF LANCASTER, OHIO, ASSIGNOR TO LIBBEY-OWENS GLASS COMPANY, OF TOLEDO, OHIO, A CORPORATION OF OHIO

GLASS TANK

Application filed March 3, 1927. Serial No. 172,224.

The present invention relates to glass apparatus.

An important object of the invention is to provide in glass apparatus, a tank furnace including a working receptacle and adjustable jack-arches or walls adapted to be partially dipped into the glass.

Another object of the invention is to provide in glass apparatus, a tank furnace including a jack-arch adapted to have its end dipped into the molten glass contained in said furnace to retard movement of the upper stratum of said glass.

Still another object of the invention is to provide in glass apparatus, a tank furnace including a jack-arch having its lower end disposed beneath the level of the molten glass passing thereunder, said jack-arch having means adapted to convey glass toward the sides of said furnace where it may be disposed of as desired.

A further and important object of the invention is to provide in glass apparatus, a tank furnace including a cooling chamber, said cooling chamber having an adjustable cap and a jack-arch having its lower end disposed beneath the surface of the molten glass passing thereunder so that sub-surface glass only will pass under said jack-arch.

A still further object of the invention is to provide in glass apparatus, a tank furnace including a cooling chamber, said cooling chamber having an adjustable cap and a jack-arch having its lower end disposed beneath the surface of the molten glass passing thereunder so that sub-surface glass only will pass under said jack-arch, the upper stratum of glass being caused by said jack-arch to move toward the sides of the cooling chamber where it may be poured into receptacles containing water, thus forming cullet from said skimmed glass.

A further object of the invention is to provide in sheet glass apparatus, a tank furnace including a cooling chamber having an insulated bottom and an adjustable cap, said cooling chamber having connected thereto a draw-pot and an adjustable jack-arch arranged somewhere between the melting end of the tank furnace and the draw-pot and adapted to have its lower end arranged below the surface of the molten glass in a manner that the top stratum of glass may be dammed off, while the sub-surface glass will be free to flow toward said draw-pot from which point it may be drawn into sheet form.

Other objects and advantages of the invention will become more apparent during the course of the following description when taken in connection with the accompanying drawings.

In the drawings wherein like numerals are employed to designate like parts throughout the same—

Fig. 1 is a vertical longitudinal section through my improved form of furnace, and Fig. 2 is a vertical transverse section thereof taken on line 2—2 and looking in the direction of the arrows.

Although the drawings illustrate a sheet glass machine associated with the tank furnace, it is to be understood that any form of glass working machine can be associated with the working receptacle or receptacles connected to said furnace.

The numeral 5 designates a tank furnace in its entirety adapted to contain a mass of molten glass 6. The mass of molten glass 6 may be produced by melting suitable ingredients in any desired manner. The numeral 7 designates a cooling chamber in its entirety which is preferably provided with an insulated bottom 8 and an adjustable cap 9. The cap 9 may comprise a plurality of refractory blocks 10 supported by means illustrated diagrammatically, and numbered 11. It is to be understood that the cables 11 illustrated are purely diagrammatic, and that any suitable supporting means may be used to adjustably mount the cap in position.

A working receptacle or draw-pot 12 is connected to the cooling chamber 7 and is adapted to receive molten glass passing from the tank furnace 5 and through the cooling chamber 7. As illustrated, a sheet of glass 13 may be continuously drawn from the mass of molten glass 14 contained in said draw-pot, the sheet being deflected over a suitable member 14' and passing over a flattening and drawing table 15. Lip-tiles 16 and shields 17 may be provided to protect the sheet 13 during its vertical run, while suitable edge engaging means 18 may be used to prevent narrowing of the sheet at its base.

Jack-arches 19 and 20 respectively are provided, and may be adjustable vertically, as desired, although for the sake of simplicity, the adjusting means are not illustrated. Although the jack-arches are illustrated as being located in the cooling chamber 7, one or more of such arches may be located anywhere along the tank furnace from the melting end to the pot.

The lower ends 21 of the jack-arches are adapted to be dipped below the surface 22 of the molten glass so that sub-surface glass only will be free to pass toward the working end. To facilitate removal of the upper stratum of glass, which is dammed off by the partially submerged jack-arches, a suitable trough means 23 may be carried by said jack-arches whereby the molten glass may flow into the trough means which are shaped as illustrated in Fig. 2 to facilitate flowing of said glass towards the sides of the furnace. As shown, the troughs 23 have bottoms inclined from the highest point 24, which is preferably centrally thereof, toward both ends. The ends of the troughs may extend past the side walls 25 of the cooling chamber where suitable receptacles 26 may be placed and filled with water 27. The molten glass will be chilled by contact with the water, forming what is known in the art as cullet, and which is numbered 28. The cullet 28 may be used again, in the batch from which the molten glass is produced.

By skimming off and disposing of the upper stratum of glass, and by causing the sub-surface movement of the glass toward the draw-pot 12, a higher quality of glass will be furnished to the draw-pot, and subsequently to the sheet 13 than in those cases where the glass is melted and permitted to flow freely toward the working end of the furnace.

Another advantage resides in the fact that the jack-arches, or a single jack-arch if desired, will effectively separate the heated gases above the melting chamber or melting end of the furnace from the cooling chamber, and will also in the construction illustrated separate the gases above the cooling chamber from those in the draw-pot. By separating the gases above the molten glass as pointed out, it is possible to create and maintain desired working conditions at these several points, so that the gases in the melting end will not affect the drawing operation at the draw-pot and vice-versa.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In glass apparatus, a tank furnace containing a mass of molten glass, a working receptacle, and a jack-arch having its lower end dipped downwardly into the molten glass and being constructed to direct the upper stratum of glass toward the opposite sides of the furnace.

2. In glass apparatus, a tank furnace containing a mass of molten glass, a working receptacle, an adjustable wall having its end dipped into said glass in a manner to dam off the upper stratum of said glass, and means carried by said wall for directing said upper stratum of glass toward the sides of the tank furnace.

3. In glass apparatus, a tank furnace containing a mass of molten glass, a working receptacle connected thereto and adapted to receive molten glass therefrom, a jack-arch having its end submerged below the level of said molten glass, and a trough carried by the end of said jack-arch.

4. In glass apparatus, a tank furnace containing a mass of molten glass, a working receptacle connected thereto and adapted to receive molten glass therefrom, a jack-arch having its lower end submerged below the surface of the molten glass, and a trough carried by said lower end of the jack-arch and adapted to direct the upper stratum of the molten glass toward the sides of said furnace.

5. In glass apparatus, a tank furnace containing a mass of molten glass, a working receptacle connected thereto and adapted to receive molten glass therefrom, a jack-arch having its lower end submerged below the surface of the molten glass, a trough carried by said lower end of the jack-arch and adapted to direct the upper stratum of the molten glass toward the sides of said furnace, and means for receiving the molten glass thus directed.

6. In glass apparatus, a tank furnace containing a mass of molten glass, a working receptacle connected thereto and adapted to receive molten glass therefrom, an adjustable jack-arch having its lower end submerged below the level of the molten glass and adapted to dam the upper stratum of the glass passing thereunder so that sub-surface glass only flows to the working receptacle, and trough means carried by the lower end of said jack-arch and adapted to convey the molten glass toward the sides of said furnace.

7. In glass apparatus, a tank furnace containing a mass of molten glass, a working receptacle connected thereto and adapted to receive molten glass therefrom, an adjustable jack-arch having its lower end submerged below the level of the molten glass and adapted to dam the upper stratum of the glass passing thereunder so that sub-surface glass only flows to the working receptacle, and trough means carried by the lower end of said jack-arch and adapted to convey the molten glass toward the sides of said furnace, the ends of said trough means extending beyond the walls of the furnace.

8. In glass apparatus, a tank furnace containing a mass of molten glass, a working receptacle connected thereto and adapted to receive molten glass therefrom, an adjustable jack-arch having its lower end submerged below the level of the molten glass and adapted to dam the upper stratum of the glass passing thereunder so that sub-surface glass only flows to the working receptacle, trough means carried by the lower end of said jack-arch and adapted to convey the molten glass toward the sides of said furnace, the ends of said trough means extending beyond the walls of the furnace, and a receptacle arranged in proximity to each end of said trough means.

9. In glass apparatus, a furnace containing a mass of molten glass, a cooling chamber associated therewith for receiving the molten glass therefrom, a jack-arch arranged at substantially the juncture of the furnace and cooling chamber and having its lower end dipped downwardly into the molten glass to allow sub-surface glass only to flow from said furnace into said cooling chamber, a working receptacle associated with said cooling chamber for receiving the molten glass therefrom, and a jack-arch arranged at substantially the juncture of the working receptacle and cooling chamber and having its lower end dipped downwardly into the molten glass for allowing sub-surface glass only to flow from said cooling chamber into said working receptacle.

10. In glass apparatus, a furnace containing a mass of molten glass, a cooling chamber associated therewith for receiving the molten glass therefrom, a jack-arch arranged at substantially the juncture of the furnace and cooling chamber and having its lower end dipped downwardly into the molten glass to allow sub-surface glass only to flow from said furnace into said cooling chamber, a working receptacle associated with said cooling chamber for receiving the molten glass therefrom, and a jack-arch arranged at substantially the juncture of the working receptacle and cooling chamber and having its lower end dipped downwardly into the molten glass for allowing sub-surface glass only to flow from said cooling chamber into said working receptacle, said jack-arches being constructed to direct the upper stratum of glass retarded thereby toward the opposite sides of the furnace and cooling chamber respectively.

11. In glass apparatus, a furnace containing a mass of molten glass, a cooling chamber associated therewith for receiving the molten glass therefrom, a jack-arch arranged at substantially the juncture of the furnace and cooling chamber and having its lower end dipped downwardly into the molten glass to allow sub-surface glass only to flow from said furnace into said cooling chamber, a working receptacle associated with said cooling chamber for receiving the molten glass therefrom, a jack-arch arranged at substantially the juncture of the working receptacle and cooling chamber and having its lower end dipped downwardly into the molten glass to allow sub-surface glass only to flow from said cooling chamber into said working receptacle, and trough means associated with the jack-arches for catching the upper stratum of glass retarded thereby and directing the same toward the opposite sides of the furnace and cooling chamber respectively.

Signed at Toledo, in the county of Lucas and State of Ohio, this 1st day of March, 1927.

LEOPOLD MAMBOURG.